(12) United States Patent
De Knijf et al.

(10) Patent No.: US 11,223,625 B2
(45) Date of Patent: Jan. 11, 2022

(54) SYSTEM AND METHOD FOR DETECTING MALICIOUS DEVICE BY USING A BEHAVIOR ANALYSIS

(71) Applicant: Avast Software s.r.o., Prague (CZ)

(72) Inventors: Jeroen De Knijf, Amsterdam (NL); Amit Siwal, Haarlem (NL); Shaul Levi, Amsterdam (NL)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 15/858,804

(22) Filed: Dec. 29, 2017

(65) Prior Publication Data

US 2018/0191746 A1 Jul. 5, 2018

Related U.S. Application Data

(60) Provisional application No. 62/578,290, filed on Oct. 27, 2017, provisional application No. 62/578,336, (Continued)

(51) Int. Cl.
*H04L 29/06* (2006.01)
*G06F 16/20* (2019.01)
(Continued)

(52) U.S. Cl.
CPC .......... *H04L 63/102* (2013.01); *G06F 16/20* (2019.01); *G06F 21/52* (2013.01); *G06F 21/554* (2013.01);
(Continued)

(58) Field of Classification Search
CPC .......... G06F 21/55; G06F 21/56; G06F 16/20; G06F 21/52; G06F 21/554;
(Continued)

(56) References Cited

U.S. PATENT DOCUMENTS 8,490,163 B1 * 7/2013 Harsell ................ G06F 21/554
726/12
8,903,593 B1 * 12/2014 Addepalli ......... H04W 72/0406
701/29.1

(Continued)

FOREIGN PATENT DOCUMENTS

WO 2016164274 A1 10/2016

OTHER PUBLICATIONS

Uluagac, A. Selcuk, A Passive Technique for Fingerprinting Wireless Devices with Wired-side Observations, 2013 IEEE Conference on Communications and Network Security (CNS), 2013, pp. 305-313, IEEE.

*Primary Examiner* — Malcolm Cribbs
(74) *Attorney, Agent, or Firm* — Erickson Kernell IP, LLC; William B. Kircher (57) ABSTRACT

Malicious behavior of a device on a local network may be detected. A data stream from a device may be collected. A functional group may be created using behavioral data of devices of a known type. A behavior profile for the functional group may be generated and stored in a database. The data stream of the device is compared to the behavior profile of the functional group. A malicious behavior is indicated for the device in response to determining that the device's current behavior is not within a predetermined or configurable threshold of the behavior profile.

20 Claims, 3 Drawing Sheets

Related U.S. Application Data filed on Oct. 27, 2017, provisional application No. 62/440,321, filed on Dec. 29, 2016, provisional application No. 62/440,361, filed on Dec. 29, 2016.

(51) Int. Cl.

| | | |
|---|---|---|
| *H04L 29/08* | (2006.01) | |
| *H04W 4/70* | (2018.01) | |
| *H04W 12/122* | (2021.01) | |
| *G06F 21/52* | (2013.01) | |
| *G06F 21/55* | (2013.01) | |
| *G06F 21/56* | (2013.01) | |
| *H04L 12/24* | (2006.01) | |
| *H04L 12/26* | (2006.01) | |

(52) U.S. Cl.
CPC .............. *G06F 21/56* (2013.01); *H04L 41/50* (2013.01); *H04L 43/0876* (2013.01); *H04L 63/104* (2013.01); *H04L 63/14* (2013.01); *H04L 63/1408* (2013.01); *H04L 63/1458* (2013.01); *H04L 67/12* (2013.01); *H04L 67/30* (2013.01); *H04W 4/70* (2018.02); *H04W 12/122* (2021.01)

(58) Field of Classification Search
CPC . H04L 63/1408; H04L 41/50; H04L 43/0876; H04L 63/102; H04L 63/104; H04L 63/14; H04L 63/1458; H04L 67/12; H04L 67/30; H04L 63/1416; H04L 63/1425; H04L 63/1441; H04W 4/70; H04W 12/12
See application file for complete search history.

(56) References Cited

U.S. PATENT DOCUMENTS

| | | | |
|---|---|---|---|
| 9,117,075 B1* | 8/2015 | Yeh | G06F 21/56 |
| 9,185,095 B1* | 11/2015 | Moritz | H04L 63/102 |
| 9,798,876 B1* | 10/2017 | Parker-Wood | G06F 21/554 |
| 9,961,574 B1* | 5/2018 | Tubi | H04L 43/065 |
| 10,505,959 B1* | 12/2019 | Wang | H04L 63/1425 |
| 2005/0086500 A1* | 4/2005 | Albornoz | G06F 21/316 |
| | | | 713/188 |
| 2012/0210429 A1 | 8/2012 | Stute | |
| 2013/0097701 A1* | 4/2013 | Moyle | G06F 21/552 |
| | | | 726/22 |
| 2013/0247187 A1* | 9/2013 | Hsiao | G06F 21/552 |
| | | | 726/22 |
| 2014/0143873 A1* | 5/2014 | Stirtzinger | H04L 63/1408 |
| | | | 726/23 |
| 2014/0230058 A1* | 8/2014 | Shulman | H04L 41/16 |
| | | | 726/23 |
| 2015/0096019 A1* | 4/2015 | Davis | H04L 63/145 |
| | | | 726/23 |
| 2016/0148103 A1 | 5/2016 | Sarrafzadeh et al. | |
| 2016/0212099 A1 | 7/2016 | Zou et al. | |
| 2016/0261465 A1* | 9/2016 | Gupta | H04L 41/14 |
| 2016/0269436 A1* | 9/2016 | Danielson | H04L 63/1433 |
| 2016/0283854 A1 | 9/2016 | Lee et al. | |
| 2016/0285897 A1* | 9/2016 | Gantman | H04L 63/1416 |
| 2017/0024660 A1* | 1/2017 | Chen | G06F 21/552 |
| 2017/0046510 A1* | 2/2017 | Chen | G06F 21/552 |
| 2017/0142119 A1* | 5/2017 | Zhang | H04L 63/102 |
| 2017/0265053 A1 | 9/2017 | Diebold et al. | |
| 2018/0039779 A1* | 2/2018 | Li | G06F 21/56 |

\* cited by examiner

SYSTEM AND METHOD FOR DETECTING MALICIOUS DEVICE BY USING A BEHAVIOR ANALYSIS

CROSS-REFERENCE TO RELATED APPLICATIONS

This application claims priority to U.S. Provisional Application No. 62/440,361 entitled "Detecting Malicious IoT Devices by Monitoring Behavior" filed Dec. 29, 2016, U.S. Provisional Application No. 62/440,321 entitled "Detecting Unknown IoT Device Types by Monitoring Their Behavior" filed Dec. 29, 2016, U.S. Provisional Application No. 62/578,290 entitled "Detecting Unknown Device Types by Monitoring Their Behavior" filed Oct. 27, 2017, and U.S. Provisional Application No. 62/578,336 entitled "Detecting Malicious IoT Device by Monitoring Behavior" filed Oct. 27, 2017. All of the above-referenced applications are currently pending, the entire disclosures of which, including the specifications and drawings, are incorporated herein by reference.

FIELD OF THE INVENTION

The present invention relates generally to detecting malicious devices on a network, and more particularly, to monitoring device behavior to determine if the device is engaging in potentially malicious behavior.

BACKGROUND OF THE INVENTION

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware, etc. A common mechanism used by malware developers is to embed the malware into a file that is made to appear desirable to user, or is downloaded and executed when the user visits a website. For example, malware may be embedded into a software application that appears legitimate and useful. The user downloads the file, and when the file is opened, the malware within the file is executed. A file that contains malware can be referred to as a malicious file.

The Internet of Things ("IoT") is a term used to describe a network comprising many different types of devices, both traditional computers and devices that in the past were not capable of network communication. A "thing" in the IoT can be any type of device that can collect data and communicate data via a network. The use of IoT devices is increasing as high speed internet services and network infrastructures are expanding. Examples of such devices can include smart home appliances, thermostats, sensors, biochips, implantable medical devices, monitoring devices, vehicle-based devices, or anything that communicates data over an Internet connection. An IoT device can provide for control and automation of devices in a smart home, a smart grid, a smart factory, a smart city, an intelligent transportation system, and other environments where IoT devices are present. In environments that include IoT devices, objects may be sensed and controlled remotely across a network infrastructure.

Detection of malware in order to protect computing devices is of major concern. Recently, there have been many attempts to improve the detection of malware. One such attempt involves determining whether one file is similar to another file or if one data object is similar to another data object. Signature analysis, heuristic analysis, behavioral analysis, hash sum analysis, and cloud-based analysis are categories of such methodological approaches. While the signature and hash sum techniques are well-known methods of detection analysis, these techniques can fail to detect modified malware code. Heuristic analysis can attempt to generally detect new malware by statically analyzing files, but it can be ineffective in detecting obfuscated malware. Behavioral analysis often proves effective in detecting modified malware, but even known methods of this analysis have a number of shortcomings. For example, known behavioral analysis methods may cause reduced performance of the system. For these reasons, a need for an improved method for detecting malicious devices, particularly without reducing system performance, exists.

SUMMARY OF THE INVENTION

The present invention relates generally to a system and method for detecting a malicious devices using behavior analysis. In order to detect malicious devices, a comparison of a device's behavior may be made with the behavior profile of a predetermined functional group.

One aspect of the present invention is directed to a method, wherein the method is carried out by a system that includes one or more devices connected through a network. The method can include the step of collecting data streams from one or more devices connected to a local network. The data streams of the devices may include, for example, a statistical amount of inbound or outbound network traffic, a type of network traffic, a source and destination port of a packet, a destination address of the packet, time between the packet arrival and transmission, and a duration of a connection. The data streams may be transmitted from one or more routers or monitor nodes to a behavior analyzer. The behavior analyzer can be coupled to a behavior database having known device behavior data obtained by one or more of user input, detection, or input from third parties. The method can also include the steps of creating functional groups based, at least in part, on behavior patterns of known devices. It may also include determining or creating behavior profiles for known devices in the functional groups. The behavior profiles can be deployed to the local network where the monitor node compares the current behavior of a device on the local network with a behavior profile. A malicious behavior is indicated for the device in response to determining that the device's current behavior is not within a predetermined or configurable threshold of the behavior profile. A user can be alerted and/or the malicious device may be shut down or quarantined if its current behavior is not within the predetermined or configurable threshold of the behavior profile.

Another aspect of the present invention is directed to a system for detecting a malicious device, such as a malicious IoT device. The system may include one or more computing devices configured for executing an executable program thereon, wherein multiple computing devices can be connected through a local network and/or the internet. The computing devices can each include one or more processors, a network interface module, and memory, wherein the processor is coupled to the network interface module and is configured execute a behavior tracking process. One or more devices, such as IoT devices, may be associated with one or more monitor nodes. The monitor nodes may each include a data stream monitor and device statistics. A router may transmit the data stream of the devices between a local network and/or an internet. A behavior analyzer can receive the data stream of the devices and compare the behavioral data of the data stream with a behavior profile of a functional group. A device may be indicated as malicious in response to determining that the data stream of the device is not within a predetermined or configurable threshold of the behavior profile. The system may alert a user and/or shut down or quarantine a malicious device if the device's current behavior is not within the predetermined or configurable threshold of the behavior profile.

A further aspect of the present invention is directed to a non-transitory computer readable storage medium having a program stored thereon that is configured to perform the method as generally described above.

BRIEF DESCRIPTION OF THE DRAWINGS

For a better understanding of the inventive subject matter, reference may be made to the accompanying drawings in which.

DETAILED DESCRIPTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the figures, the same reference number is used throughout to refer to an identical component that appears in multiple figures. Signals and connections may be referred to by the same reference number or label, and the actual meaning will be clear from its use in the context of the description. In general, the first digit(s) of the reference number for a given item or part of the invention should correspond to the figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
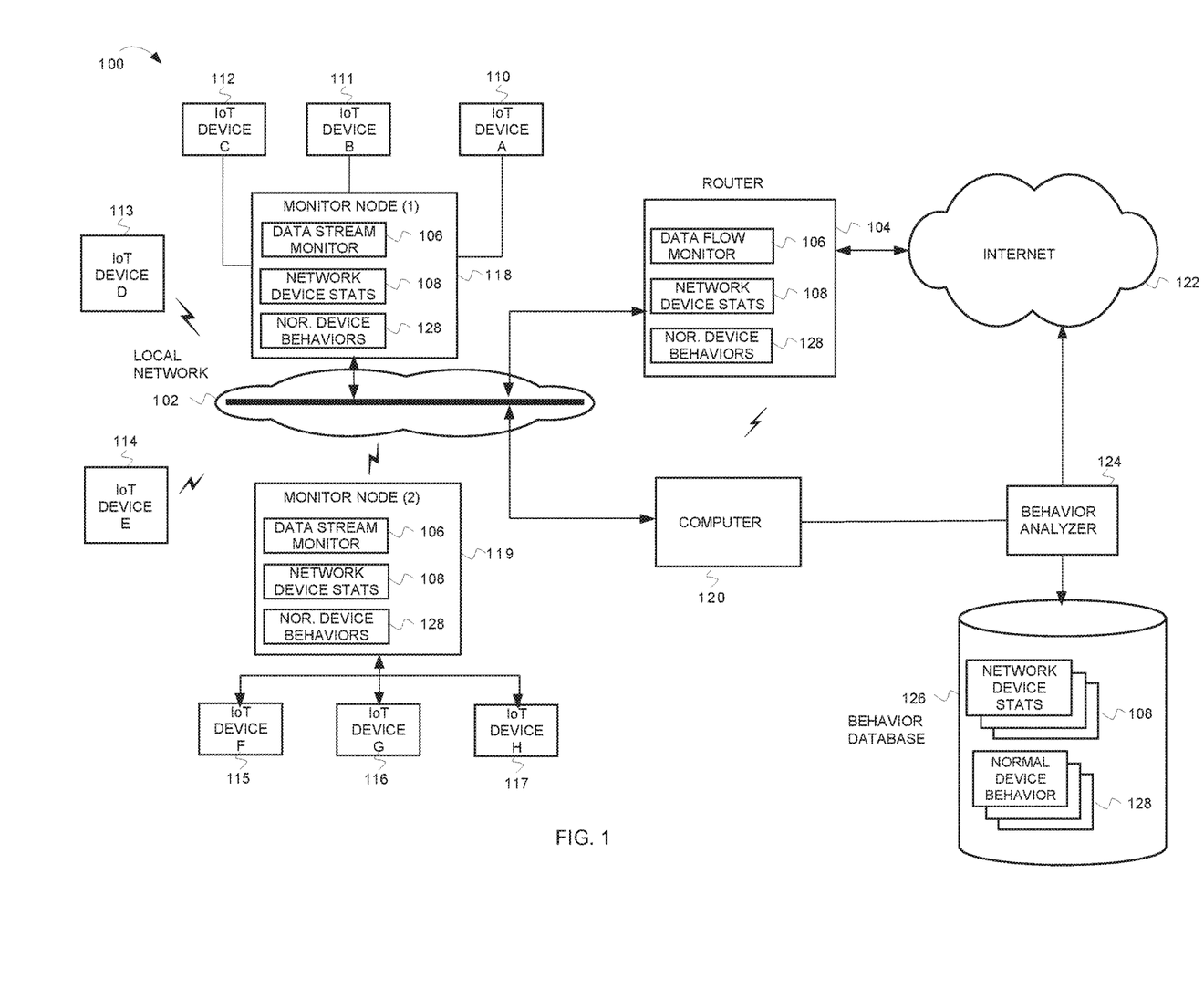
FIG. 1 is a block diagram illustrating a system for detecting a malicious IoT device in accordance with one embodiment of the present invention.

FIG. 1 is a block diagram illustrating a system 100 for detecting a malicious IoT device in accordance with one embodiment of the present invention. In some aspects, system 100 can include a local network 102, router 104, IoT devices 110-117, computer 120, monitor nodes 118-119, internet 122, behavior analyzer 124, and central database 126.

Local network 102 can be a wired network, a wireless network, or any combination thereof. Any of the wired or wireless networks may be a home network, local area network (LAN), metropolitan area network (MAN), wide area network (WAN), corporate intranet, or any combination thereof.

Internet 122 can be any collection of one or more internets, wired networks, wireless networks, or combinations thereof that cover a greater domain than local network 102.

An IoT device (e.g., IoT devices 110-117) can be any type of device that can collect data, receive commands, and communicate data via local network 102 and/or internet 122. Examples of such devices include, but are not limited to smart home appliances, thermostats, sensors, biochips, office devices, implantable medical devices, vehicle-based devices, or other devices that communicate data over a local network 102 and/or internet 122 connection. Some IoT devices (e.g., IoT devices 113-114) can perform wireless connectivity, which may support direct data communication to the local network 102 and/or internet 122.

Computer 120 can be a server computer, a laptop computer, a tablet computer, a smart phone, a set-top box, or any other device having one or more processors and memories enabling the device to execute programs. The embodiments are not limited to any particular type of computing device. The computing device can include a user client device (not shown) that may be operated by a user. The computer unit 120 can include one or more of software programs, applications, or other programmable logic that can be configured to compare one or more files with one or more other files.

Router 104 can forward network data between local network 102 and internet 122. Router 104 can be a stand-alone router, a wireless router or access point, a modem/router or any other device that forwards data between local network 102 and internet 122. In some aspects of the disclosure, router 104 can include a data stream monitor 106. In one embodiment, monitor nodes 118 and 119 can be IoT hubs that transfer or control a network connected the IoT devices 110-117. Monitor nodes 118 and 119 can each include data stream monitor 106 and/or network device statistics 108. Data stream monitor 106 can capture the data stream of devices in local network 102, such as IoT devices 110-117, computer 118, and any other devices on local network 102. Data stream monitor 106 can determine various statistics from the data stream such as network device statistics 108. In some aspects, network device statistics 108 can include various combinations of one or more of:

The amount of inbound/outbound traffic per device per minute.
Type of traffic.
Source and destination port of a packet.
Destination address of a packet.
Duration of the connection.
Time between the packets.

Network device statistics 108 can be maintained on a per device basis.

Monitor nodes 118-119 can each be a computing device similar to computer 120. Monitor nodes 118-119 can execute a data stream monitor 106 to generate network device statistics 108 instead of, or in addition to, router 104. For example, monitor nodes 118-119 can execute a network sniffer program that captures packets from network 102.

Network device statistics 108 can be transmitted from router 104 or computer 120 to behavior analyzer 124 via internet 122. Behavior analyzer 124 can store the network device statistics 108 in central database 126. In addition to network device statistics 108, central database 126 can include normal device behaviors 128. Normal device behaviors 128 include data regarding the normal behavior of IoT devices. Normal behaviors 128 can be estimated based on the measured behavior of functionally similar devices, i.e., devices that can be grouped based on similar function.

Behavior analyzer 124 can use the network device statistics 108 to determine normal device behavior 128 as further described below with respect to FIG. 2.

It should be noted that although only one local network 102 is illustrated in FIG. 1, behavior analyzer 124 can receive network device statistics 108 from many different local networks 102.

Figure 2:
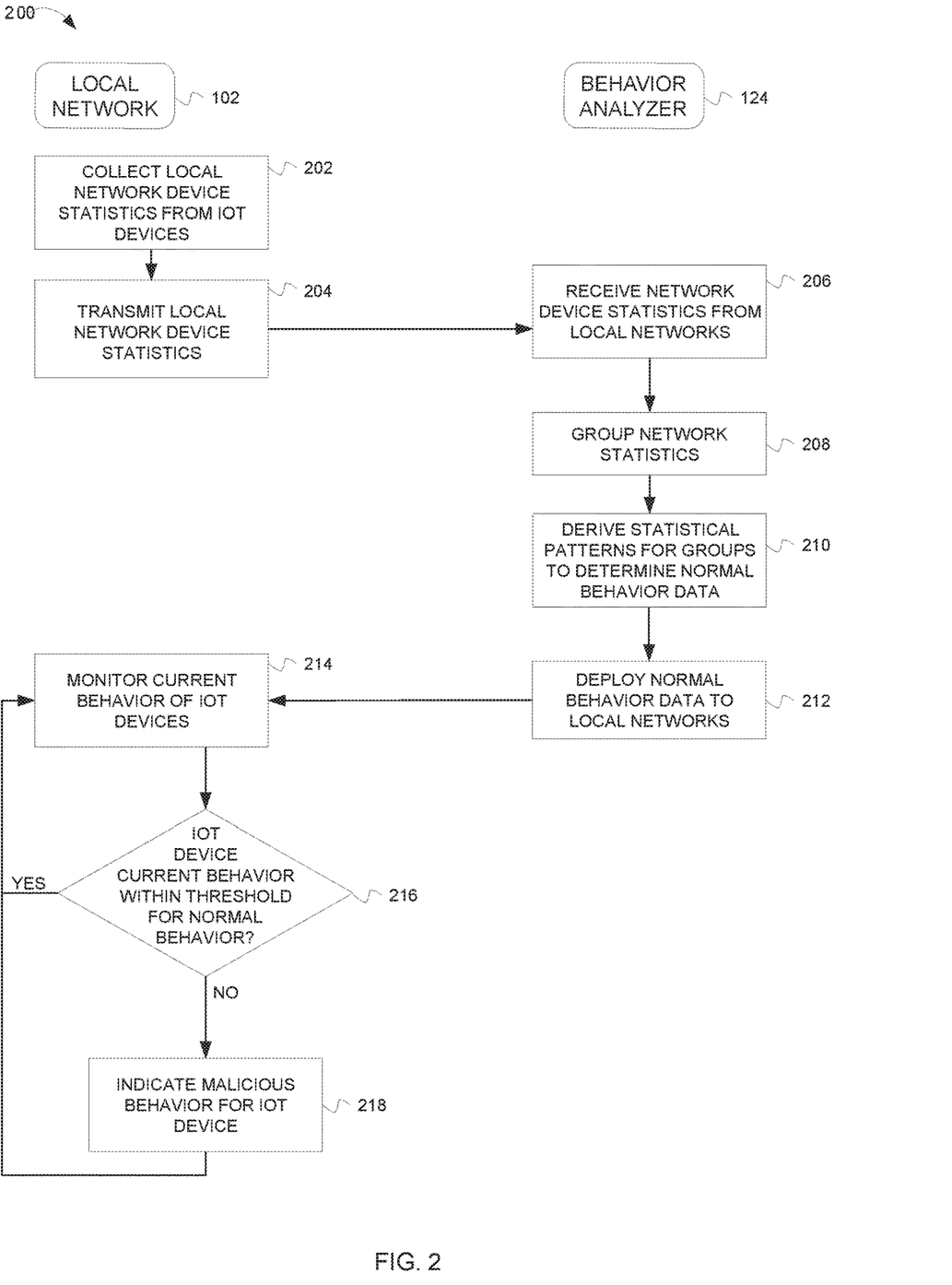
FIG. 2 is a flow chart illustrating operations of a method for detecting a malicious IoT device using a behavior analysis in accordance with one embodiment of the present invention.

FIG. 2 is a flow chart illustrating operations of a method 200 for detecting a malicious IoT device by determining IoT device behavior. The flow chart illustrates the interaction between one local network 102 and behavior analyzer 124. One of skill in the art having the benefit of the disclosure will appreciate that multiple local networks can contribute IoT device data.

The method 200 can begin at block 202 by a data stream monitor 106 on local network 102 collecting network device statistics 108 from devices, including IoT devices. At block 204, the data stream monitor on local network 102 can transmit the network device statistics 108 to behavior analyzer 124.

At block 206, behavior analyzer 124 receives the network device statistics 108 and can store the network device statistics 108 in central database 126. As noted above, the network device statistics 108 can be received from multiple local networks 102.

At block 208, the IoT devices can be grouped by device type, and can also be grouped into functional groups. In some aspects, a functional group is a group that performs the same task. For example, one such group can be IP-cameras (of different vendors, with different operating systems). Another group can be media players such as smart speaker systems, smart televisions, and the like. A further group can be game consoles. Those of skill in the art will appreciate that many other groups can exist and such groups are within the scope of the inventive subject matter. A device can be a member of more than one group. For example, a Microsoft Xbox can both belong to the game consoles group as well as to the media player group. Furthermore, a group can have subgroups that can represent multiple granularity layers. For example, IP-cameras can be further divided into subgroups comprising outdoor cameras and indoor cameras. In some aspects, grouping can be further refined by various other additional information. For example, the grouping can be refined base on time zone, country of residence, seasonal influences, time of day, day of week, month, and external events such as sporting events, political events etc.

At block 210, a normal device behavior can be estimated for the identified groups and subgroups. In some aspects, statistical patterns are derived for the different groups and subgroups to determine normal device behavior for the groups and subgroups. The normal device behavior can include data that describes the usual behavior of devices that belong to that group. In particular, for every group the normal behavior can be estimated based upon the behavioral data for that group. That is, for every group, statistical patterns can be derived that use the different types of data available in central database 126. Such a pattern would capture (with statistical bounds) the normal behavior for the group, and the data element. An example of such a pattern could be: with a certainty of 99%, the minimal time between packets is at least ten milliseconds. However, patterns that combine different data elements is possible: e.g., when the duration of the connection is larger than 10 seconds, the amount of incoming traffic is at least five times the amount of outgoing traffic.

It should be noted that this learning process can be a continuous process. That is, it is very likely that behavior of devices will change over time and that new types of IoT devices will arise. As such, it is desirable to update the central database 126 regularly in order to update the estimates for normal behavior.

At block 212, the normal device behavior is deployed back to the local network 102.

At block 214, data stream monitor 106 on local network 102 monitors the current behavior of IoT devices on the local network 102.

At block 216, data stream monitor 106 determines if the current IoT device behavior is within a threshold for normal device behavior for its device type or group. In some aspects, data stream monitor 106 can calculate a score that reflects how likely it is that the current behavior of an IoT device is in accordance with the normal behavior of its particular group or subgroup. In particular aspects, this score can be calculated by using a statistical test of the current observed data and the statistical normal behavior patterns derived for the different groups or subgroups of the device.

If the score is above a certain threshold, then at block 218, the device behavior is flagged as malicious. A user or administrator of local network 102 can be alerted to the malicious IoT device. In alternative aspects, the malicious IoT device can be automatically shut down or quarantined to minimize the impact of the malicious behavior.

Figure 3:
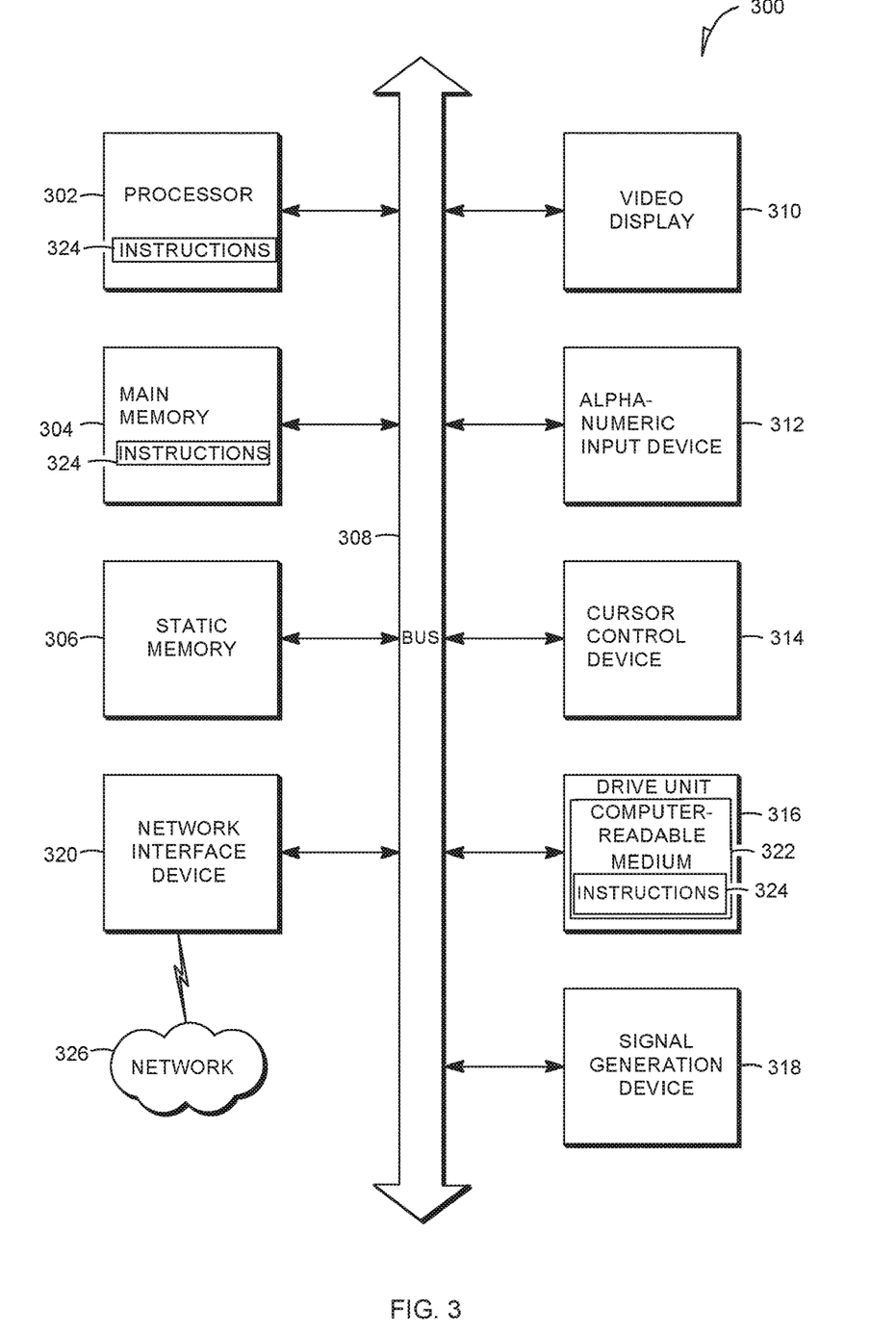
FIG. 3 is a block diagram of an example embodiment of a computer system upon which embodiments of the inventive subject matter can execute.

FIG. 3 is a block diagram of an example embodiment of a computer system 300 upon which embodiments of the inventive subject matter can execute. The description of FIG. 3 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system 100 as disclosed herein can be spread across many physical hosts. Therefore, many systems and sub-systems of FIG. 3 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A computer-implemented method for detecting a malicious device within one or more related networks, the computer-implemented method comprising the steps of:
    collecting at least one data stream for one or more first devices from one or more local networks;

creating functional groups based, at least in part, on behaviors of second devices, wherein each of the functional groups is comprised of second devices that perform the same task;

determining behavior profiles for the second devices in the functional groups wherein the behavior profiles include behavioral data estimated to be normal behavior, said normal behavior based on patterns derived using statistical bounds, wherein said patterns derived using statistical bounds comprise determining with a predetermined certainty that a device behavior occurs, wherein said certainty comprises a percentage certainty, and wherein said device behavior comprises: a minimal time between packets, a duration of connection time, and combinations thereof; and deploying the behavior profiles to at least one monitor node on the one or more local networks, wherein the at least one monitor node on the one or more local networks includes a data stream monitor and is configured to compare a current behavior of a first device with a behavior profile of the behavior profiles, and to indicate malicious behavior for the first device in response to determining that the current behavior thereof is not within a predetermined or configurable threshold of the compared behavior profile.

2. The computer-implemented method of claim 1, wherein the at least one data stream for the one or more first devices includes one or more of: a statistical amount of inbound or outbound network traffic, a type of network traffic, a source and destination port of a packet, a destination address of the packet, time between the packet arrival and transmission, and a duration of a connection.

3. The computer-implemented method of claim 1, wherein the at least one data stream for the one or more first devices is transmitted from one or more routers or the at least one monitor node to a device outside of the local network.

4. The computer-implemented method of claim 3, wherein the one or more routers or the at least one monitor node are coupled to an internet, and wherein the internet is coupled to the device outside of the local network.

5. The computer-implemented method of claim 4, wherein the device outside of the local network is coupled to a behavior database having known device behavior data obtained by one or more of user input, detection, or input from third parties.

6. The computer-implemented method of claim 1 further comprising the step of:
alerting a user that the first device is malicious if the current behavior of the first device is not within the predetermined or configurable threshold of the compared behavior profile.

7. The computer-implemented method of claim 1 further comprising the step of:
shutting down or quarantining the first device if the current behavior of the first device is not within the predetermined or configurable threshold of the compared behavior profile.

8. A system for detecting a malicious device within one or more related networks, the system comprising:
one or more devices associated with one or more monitor nodes, wherein each of the one or more monitor nodes includes a data stream monitor;
one or more routers to forward a data stream of the one or more devices between a local network and an internet; and
a computer configured to receive the data stream of the one or more devices, compare behavioral data of the data stream of the one or more devices with a behavior profile of at least one functional group wherein the behavior profile includes behavioral data estimated to be normal behavior, said normal behavior based on patterns derived using statistical bounds, wherein said patterns derived using statistical bounds comprise determining with a predetermined certainty that a device behavior occurs, and, based on the determination, determine whether the one or more devices are malicious,
wherein said certainty comprises a percentage certainty;
wherein said device behavior comprises: a minimal time between packets, a duration of connection time, and combinations thereof;
wherein the at least one functional group is comprised of devices that perform the same task, and
wherein a first device is indicated as malicious in response to determining that the data stream of the first device is not within a predetermined or configurable threshold of the compared behavior profile.

9. The system of claim 8, wherein a user is alerted that the first device is malicious if the data stream of the first device is not within the predetermined or configurable threshold of the compared behavior profile.

10. The system of claim 8, wherein the first device is shut down or quarantined if the data stream of the first device is not within the predetermined or configurable threshold of the compared behavior profile.

11. The system of claim 8, further comprising a computing device including one or more processors, a network interface module, and memory, and wherein the processor is coupled to the network interface module and is configured to execute a behavior tracking process.

12. The system of claim 8, wherein the device outside of the local network is coupled to a behavior database having the behavior profile and known device behavior data.

13. The system of claim 8, wherein the one or more monitor nodes include a data stream monitor and device statistics.

14. A non-transitory computer readable storage medium having a program stored thereon, the program causing a system to execute the steps of:
collecting at least one data stream for one or more first devices from one or more local networks;
creating functional groups based, at least in part, on behaviors of second devices, wherein each of the functional groups is comprised of second devices that perform the same task;
determining behavior profiles for the second devices in the functional groups wherein the behavior profiles include behavioral data estimated to be normal behavior, said normal behavior based on patterns derived using statistical bounds, wherein said patterns derived using statistical bounds comprise determining with a predetermined certainty that a device behavior occurs, wherein said certainty comprises a percentage certainty, and wherein said device behavior comprises: a minimal time between packets, a duration of connection time, and combinations thereof; and
deploying the behavior profiles to at least one node on the one or more local networks, wherein the at least one node on the one or more local networks includes a data stream monitor and is configured to compare a current behavior of a first device with a behavior profile of the behavior profiles, and to indicate malicious behavior for the first device in response to determining that the current behavior thereof is not within a predetermined or configurable threshold of the compared behavior profile.

15. The non-transitory computer readable storage medium of claim 14, wherein the at least one data stream for one or more first devices includes one or more of: a statistical amount of inbound or outbound network traffic, a type of network traffic, a source and destination port of a packet, a destination address of the packet, time between the packet arrival and transmission, and a duration of a connection.

16. The non-transitory computer readable storage medium of claim 14, wherein the at least one data stream for the one or more first devices is transmitted from one or more routers or monitor nodes to a device outside of the local network.

17. The non-transitory computer readable storage medium of claim 16, wherein the one or more routers or monitor nodes are coupled to an internet, and wherein the internet is coupled to the device outside of the local network.

18. The non-transitory computer readable storage medium of claim 17, wherein the device outside of the local network is coupled to a behavior database having known device behavior data obtained by one or more of user input, detection, or input from third parties.

19. The non-transitory computer readable storage medium of claim 14, wherein a user is alerted that the first device is malicious if the current behavior of the first device is not within the predetermined or configurable threshold of the compared behavior profile.

20. The non-transitory computer readable storage medium of claim 14, wherein the first device is shut down or quarantined if the current behavior of the first device is not within the predetermined or configurable threshold of the compared behavior profile.

* * * * *